US008103772B2

(12) United States Patent
Schreter

(10) Patent No.: US 8,103,772 B2
(45) Date of Patent: *Jan. 24, 2012

(54) CLUSTER EXTENSION IN DISTRIBUTED SYSTEMS USING TREE METHOD

(75) Inventor: Ivan Schreter, Leimen (DE)

(73) Assignee: SAP Aktiengesellschaft, Walldorf (DE)

( * ) Notice: Subject to any disclaimer, the term of this patent is extended or adjusted under 35 U.S.C. 154(b) by 1468 days.

This patent is subject to a terminal disclaimer.

(21) Appl. No.: 10/746,977

(22) Filed: Dec. 24, 2003

(65) Prior Publication Data

US 2005/0160170 A1 Jul. 21, 2005

(51) Int. Cl.
*G06F 15/173* (2006.01)

(52) U.S. Cl. ........................................ 709/226; 709/223

(58) Field of Classification Search .................. 709/223, 709/224, 225, 226, 201, 202, 203, 249
See application file for complete search history.

(56) References Cited

U.S. PATENT DOCUMENTS

| | | | | |
|---|---|---|---|---|
| 5,475,837 | A * | 12/1995 | Ishak et al. .............................. | 1/1 |
| 6,279,007 | B1 * | 8/2001 | Uppala ................... | 1/1 |
| 6,438,592 | B1 * | 8/2002 | Killian .......................... | 709/224 |
| 6,463,454 | B1 * | 10/2002 | Lumelsky et al. ............. | 718/105 |
| 6,615,258 | B1 * | 9/2003 | Barry et al. ..................... | 709/223 |
| 6,654,859 | B2 * | 11/2003 | Wooldridge .................... | 711/147 |
| 6,697,365 | B1 * | 2/2004 | Messenger ..................... | 370/390 |
| 6,725,261 | B1 * | 4/2004 | Novaes et al. ................. | 709/220 |
| 6,789,112 | B1 * | 9/2004 | Freeman et al. .............. | 709/223 |
| 6,801,949 | B1 | 10/2004 | Bruck et al. | |
| 6,922,724 | B1 | 7/2005 | Freeman et al. | |
| 6,938,084 | B2 * | 8/2005 | Gamache et al. ............. | 709/226 |
| 7,020,698 | B2 * | 3/2006 | Andrews et al. .............. | 709/223 |
| 7,234,079 | B2 * | 6/2007 | Cheng et al. .................... | 714/20 |
| 7,272,613 | B2 | 9/2007 | Sim et al. | |
| 7,284,096 | B2 | 10/2007 | Schreter | |
| 7,337,214 | B2 * | 2/2008 | Douglass et al. ............. | 709/214 |
| 7,386,702 | B2 | 6/2008 | Schreter | |
| 7,406,501 | B2 * | 7/2008 | Szeto et al. ................... | 709/206 |
| 7,463,648 | B1 | 12/2008 | Eppstein et al. | |
| 7,464,100 | B2 | 12/2008 | Schreter | |

(Continued)

OTHER PUBLICATIONS

Non-Final Office Action Issued by the United States Patent and Trademark Office (11 pages); Notices of References (1 page); all mailed on Oct. 3, 2007 in U.S. Appl. No. 10/746,972 (Total 12 pages).
Supplemental Non-Final Office Action Issued by the United States Patent and Trademark Office on Nov. 9, 2007 in U.S. Appl. No. 10/746,972 (Total 12 pages).
Final Office Action Issued by the United States Patent and Trademark Office on Feb. 21, 2008 in U.S. Appl. No. 10/746,972 (Total 15 pages).

(Continued)

*Primary Examiner* — Kamal B. Divecha
*Assistant Examiner* — Dhairya A Patel
(74) *Attorney, Agent, or Firm* — Fish & Richardson P.C.

(57) ABSTRACT

Methods and apparatus, including computer program products, for managing a cluster of servers organized into nodes. A method of one aspect includes establishing a cluster; establishing a set of ultimate identifiers for nodes resulting from splitting in the cluster; and storing every new data object on a node that has a node identifier that identifies a subset of the set of ultimate identifiers, and providing for the object a universal identifier that combines (i) an object identifier that is unique on the node and (ii) a server identifier that is one of the ultimate identifiers in the subset. A method of another aspect includes generating for a new data object a universal identifier that has a node identifier part that uniquely identifies a node, a reserve part generated at least in part as a pseudo-random value, and an object identifier part that uniquely identifies the object in the node.

35 Claims, 3 Drawing Sheets

U.S. PATENT DOCUMENTS

| | | | |
|---|---|---|---|
| 2002/0133491 | A1 | 9/2002 | Sim et al. |
| 2003/0046369 | A1 | 3/2003 | Sim et al. |
| 2003/0108052 | A1* | 6/2003 | Inoue et al. ............. 370/399 |
| 2003/0177240 | A1 | 9/2003 | Gulko et al. |
| 2004/0068521 | A1* | 4/2004 | Haacke et al. ............ 707/200 |
| 2004/0153558 | A1* | 8/2004 | Gunduc et al. ............ 709/229 |
| 2004/0186846 | A1 | 9/2004 | Birdwell et al. |
| 2004/0215709 | A1 | 10/2004 | Basani et al. |
| 2005/0055511 | A1 | 3/2005 | Schreter |
| 2005/0097258 | A1 | 5/2005 | Schreter |
| 2005/0149472 | A1 | 7/2005 | Schreter |
| 2005/0149627 | A1 | 7/2005 | Schreter |
| 2005/0160170 | A1 | 7/2005 | Schreter |
| 2005/0234931 | A1 | 10/2005 | Yip et al. |
| 2006/0109966 | A1* | 5/2006 | Sasakura et al. ............ 379/177 |
| 2006/0218533 | A1 | 9/2006 | Koduru et al. |
| 2007/0021970 | A1 | 1/2007 | Schreter |
| 2007/0049246 | A1 | 3/2007 | Schreter et al. |
| 2007/0050349 | A1 | 3/2007 | Schreter |
| 2008/0250203 | A1 | 10/2008 | Schreter |

OTHER PUBLICATIONS

Final Office Action Issued by the United States Patent and Trademark Office on Feb. 28, 2008; in U.S. Appl. No. 10/746,972 (Total 15 pages).

Non-Final Office Action Issued by the United States Patent and Trademark Office (22 pages); Notice of References (1 page); all mailed on Aug. 15, 2008 in U.S. Appl. No. 10/746,972 (Total 23 pages).

Final Office Action Issued by the United States Patent and Trademark Office (21 pages); Notice of References (1 page); all mailed on Mar. 10, 2009 in U.S. Appl. No. 10/746,972 (Total 23 pages).

Advisory Action issued in U.S. Appl. No. 10/746,972 on May 29, 2008; 3 pages.

Advisory Action issued in U.S. Appl. No. 10/746,972 on May 28, 2009; 3 pages.

Notice of Panel Decision from Pre-Appeal Brief Review issued in U.S. Appl. No. 10/746,972 on Jul. 29, 2009; 2 pages.

Examiner's Answer to Appeal Brief issued in U.S. Appl. No. 10/746,972 on Jun. 9, 2010; 28 pages.

* cited by examiner

CLUSTER EXTENSION IN DISTRIBUTED SYSTEMS USING TREE METHOD

BACKGROUND

The present invention relates to data processing by digital computer, and more particularly to address generation and cluster extension in distributed systems.

Data used by computer program applications is often structured as and represented by data objects, and applications generally write and read data objects to and from a database.

In a common data storage architecture, a data storage system includes one or more front-end servers ("front ends"), each of which communicates with a cluster of back-end servers ("back ends"). The back-end servers store data objects and are organized into one or more nodes or groups. A node is a group of servers that mirror each other, e.g., that contain the same database fragment. (The term "server" will be understood to refer to a back-end server unless the context indicates otherwise.) While technically a node can have only a single server, there should be at least two servers in each node to achieve high availability. The cluster is a potentially distributed system of back-end servers. The front-end server is a server that communicates with the back-end servers and operates to provide an interface between the cluster and applications.

Over time, the load on individual servers within the cluster will tend to increase. This is due to several factors, such as a reduction in the free capacity of each server as data objects accumulate on it, and more frequent accesses of each server by computer applications as more and more data objects are located on it. The capacity of the cluster will need to be expanded when the load becomes too great.

A common approach to increasing the capacity of a cluster is to add a new server to the cluster. This generally requires moving some data objects to the new server, which can involve rehashing the database. This is especially problematic in object-oriented databases, where the data objects must be identified by an object identifier that does not change during the lifetime of the data object.

SUMMARY

The invention provides methods, systems, and apparatus, including computer program products, for address generation and cluster extension in distributed data storage systems.

In general, in one aspect, the invention provides a method for managing data storage servers. The method includes establishing a cluster of back-end servers organized into nodes, every node in the cluster having a node identifier that is unique in the cluster, every back-end server in any node mirroring every other back-end server in the same node; establishing a predefined set of ultimate identifiers for nodes that could be created in the cluster; and storing every new data object on the cluster on a particular node, the particular node having a particular node identifier that identifies a subset of the set of ultimate identifiers, and providing for the object a universal identifier that combines (i) an object identifier that is unique on the particular node and (ii) a server identifier, where the server identifier is one of the ultimate identifiers in the subset, and where the node identifiers for nodes existing in the cluster at any one time identify non-overlapping subsets of the set of ultimate identifiers.

The method can be implemented to include one or more of the following advantageous features. The set of ultimate identifiers is a set of binary numbers of a fixed length; and each node in the cluster has a node identifier that is a binary number of the fixed length or of a length less than the fixed length. The set of ultimate identifiers is the set of 32-bit binary numbers; and the object identifier is a 32-bit binary number. Each node identifier identifies a subset of the set of ultimate identifiers by being a beginning part or an ending part of each identifier in the subset or by being the only identifier in the subset. The particular node identifier is not an ultimate identifier; and the server identifier includes a part generated as a pseudo-random value. The pseudo-random value is generated by a back-end server. The pseudo-random value is generated by a front-end server. The method further includes splitting a first node into new nodes, where the first node had a first node identifier that identified a first subset of the set of ultimate identifiers, the new nodes each have a distinct node identifier that identifies a new distinct subset of the first subset, and the union of the new distinct subsets is the first subset; assigning to each new node at least one of the back-end servers of the first node; and removing from each back-end server of each new node any data objects that have a server identifier that does not correspond to the node identifier for the new node to which the back-end server is assigned. The set of ultimate identifiers is a set of binary numbers of a fixed length; the first node has a first node identifier that is a binary number of a length less than the fixed length; and the node identifier of each new node includes within it the binary number of the first node identifier. The method further includes using a load measured for each node in the cluster in selecting the first node as a node to be split. The method further includes determining whether the first node has fewer than four back-end servers and, if it does, adding back-end servers to the first node so that the first node has at least four back-end servers, and then populating the added back-end servers with all of the data objects stored on the first node, before splitting the first node.

In general, in another aspect, the invention features a method for generating an identifier for a new data object to be stored in a cluster of back-end servers of the kind where the cluster is organized into nodes and every node in the cluster has a node identifier that is unique in the cluster, and where every back-end server in any node mirrors every other back-end server in the same node. The method includes generating a universal identifier for a new data object, the universal identifier having a node identifier part that uniquely identifies a first node in the cluster, a reserve part, and an object identifier part that uniquely identifies the object in the first node, the reserve part being at least in part generated as a pseudo-random value.

The method can be implemented to include one or more of the following advantageous features. The node identifier part and the reserve part have a combined length that is a predetermined fixed length; and the object identifier part does not uniquely identify the new data object on the cluster. The reserve part is generated by the first node and given a value to maintain some locality between the new data object and certain other data objects stored on the first node. The node identifier part and the reserve part are both generated as pseudo-random values. The node identifier part is modified for load balancing. The node identifiers have a structure represented as a binary tree in a front-end server, and load balancing includes navigating the binary tree to select a node based on the relative loads on the nodes of the cluster.

In general, in other aspects, the invention features computer program products and systems implementing the features of the foregoing methods.

The invention can be implemented to realize one or more of the following advantages. Data objects are addressed in such a way that it is simple to add a new node to a cluster. Operation of the expansion mechanism naturally tends to keep the data and processing load relatively well balanced. It is unnecessary to redistribute data after a new server is added to a cluster.

The details of one or more embodiments of the invention are set forth in the accompanying drawings and the description below. Other features, aspects, and advantages of the invention will be apparent from the description, drawings, and claims.

DESCRIPTION OF DRAWINGS

Like reference symbols in the various drawings indicate like elements.

DETAILED DESCRIPTION

Figure 1:
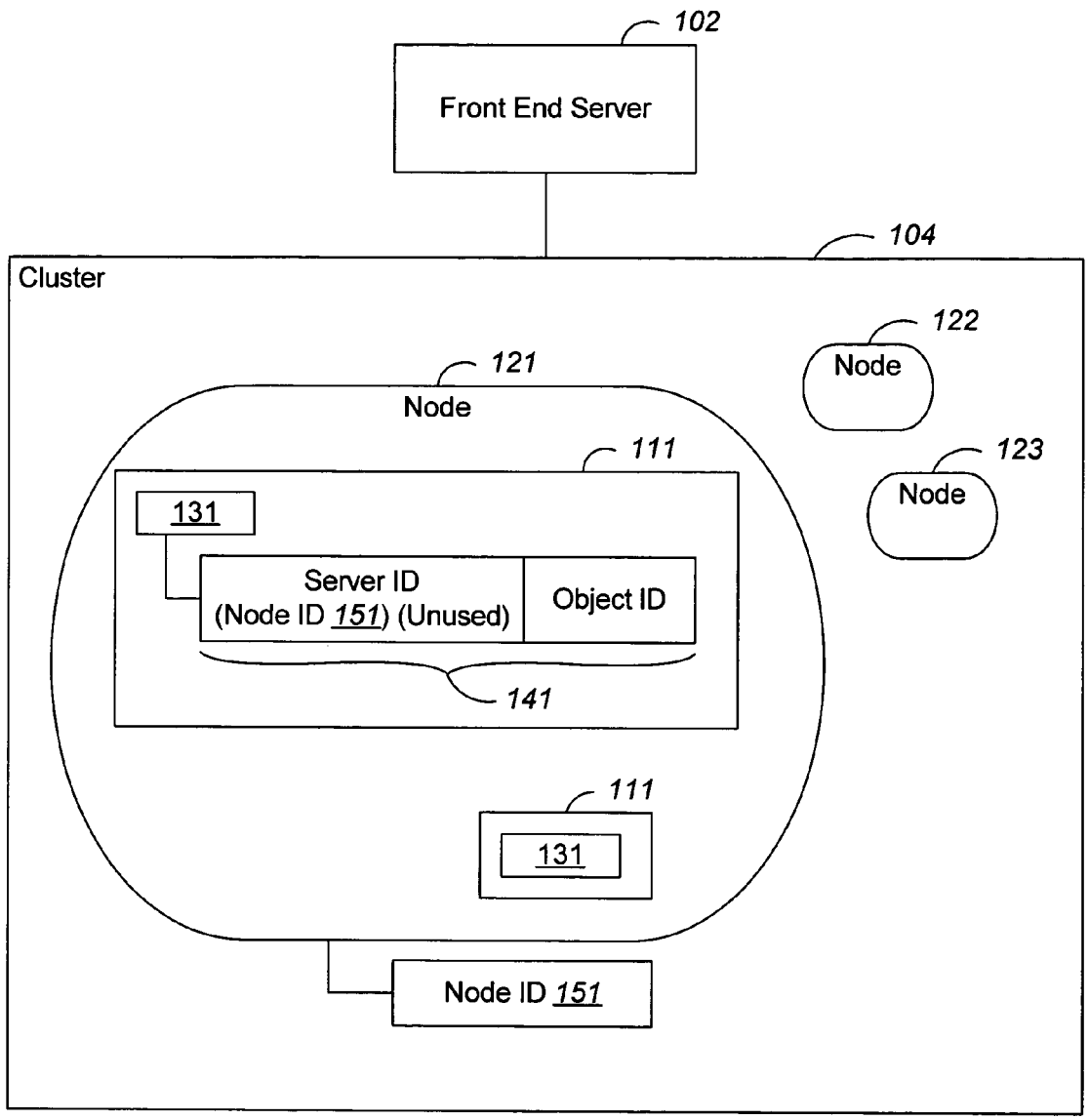
FIG. 1 is a block diagram of a data storage system.

FIG. 1 illustrates a data storage system in accordance with the invention. The system has a front-end server 102 in communication with a cluster 104 of back-end servers. The back-end servers are structured as back-end groups or node groups ("nodes" for short) 121, 122, and 123. Each node in the cluster has at least one server. Each node has, as one of its properties, a node identifier ("node ID") that identifies it uniquely in the cluster. Node 121 is illustrated as having a node ID 151. Node 121 is also illustrated as having two servers 111, which mirror each other because they are in the same node. Each server will generally store numerous data objects. Servers 111 are illustrated as storing a data object 131.

One property of each data object is the address by which it is identified in the cluster. Object 131 is identified by a universal identifier 141. The universal identifier has two parts, the server ID and the object ID. The server ID has a part that is used and represents the actual node in which the object is currently stored (e.g., that represents node 121 for object 131) and will generally have a part that is currently unused and reserved for use if the node is later split. The object ID is an identifier that identifies the object uniquely on a back-end server, i.e., uniquely on the node on which the object is stored. The universal identifier, on the other hand, is universal in the sense that is unique on the cluster as a whole; it is an address a front-end server can use to address the object. In addition, it is desirable that the universal identifier remain unchanged during the lifetime of the object, even if its node is split. This is a feature of the techniques that will be described.

It is not necessary that the parts of the universal identifier have any particular arrangement, or that the universal identifier be of any particular size. For ease of exposition, however, an advantageous implementation will now be described in which the universal identifier has the fixed size of 64 bits, 32 bits for the server ID and 32 bits for the object ID, and in which the used part (the node ID) of the server ID is stored as the prefix or leading part of the server ID, and the unused part, if any, is stored as the suffix or trailing part of the server ID. This arrangement allows nodes to be organized easily in a binary tree structure in which it is simple to add new nodes by splitting.

Figure 2:
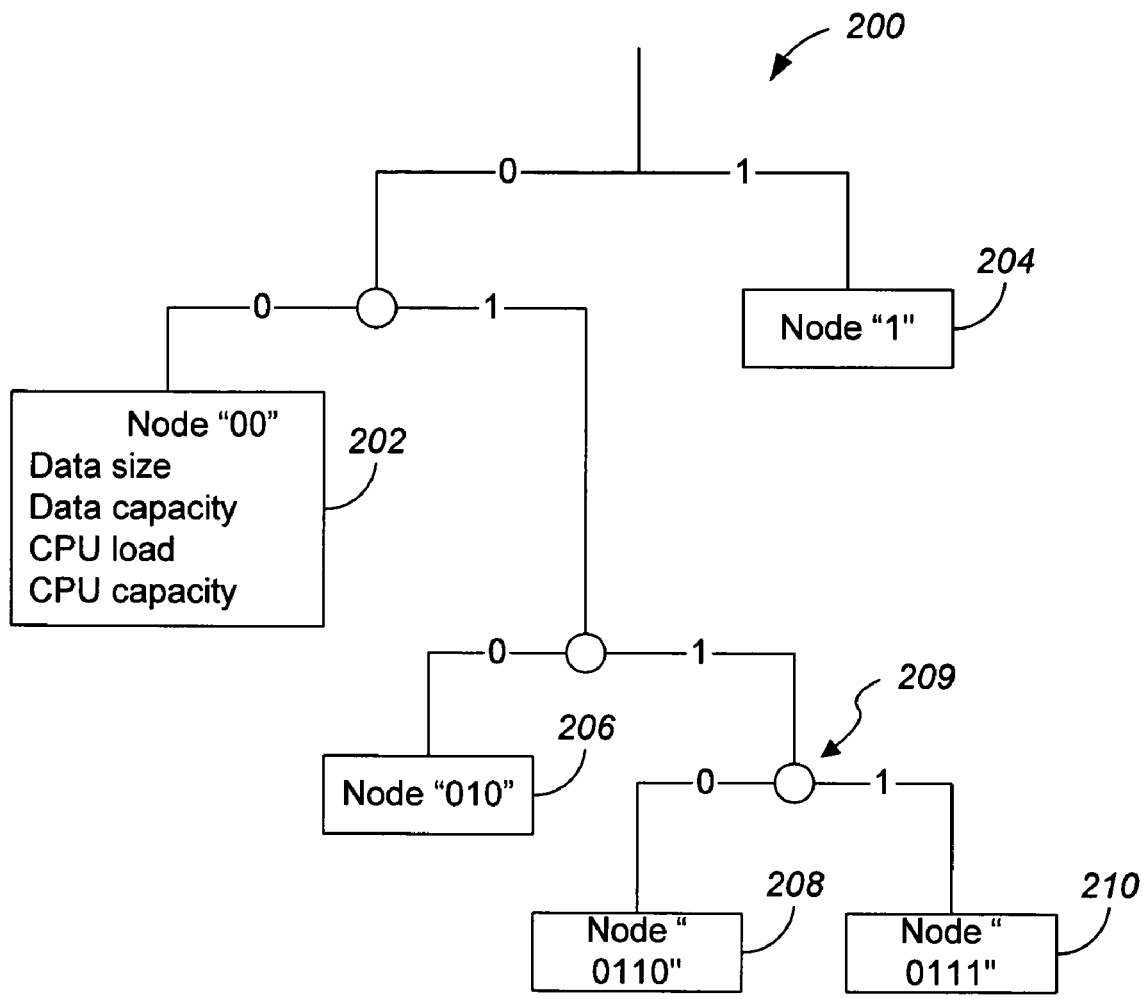
FIG. 2 is a block diagram illustrating a node tree.

In this implementation, as illustrated in FIG. 2 by nodes 202, 204, 206, 208, and 210, the nodes are organized in an unbalanced binary tree 200 with defined maximum depth, which is 32 in the implementation being described. Paths in this tree from root to nodes, which are always leaves in the tree, are binary strings that define node IDs. Thus, the path to node 210 defines its node ID, the binary string "0111".

Node status information is associated with each node in the tree. In the present implementation, this information includes four values, as illustrated in node 202. These are the aggregate data size, the aggregate data capacity, the aggregate CPU load, and the aggregate CPU capacity of the node. These values are updated from time to time to provide the data for optimization and load balancing in connection with address generation. The updating can be provided asynchronously by the back-end servers or requested periodically by the front-end server or servers. As noted earlier, there may be more than one front-end server, in which case each front-end server has a private copy of this tree.

Before a new object can be stored, it must have a universal identifier ("universal ID"). The object ID part of the universal ID can be generated by a back-end server after the node on which the object will be stored has been selected. The server ID part can be generated by a front-end server to combine the node ID for the node selected to store the object and a generated unused (trailing) part that has a random value.

Figure 3:
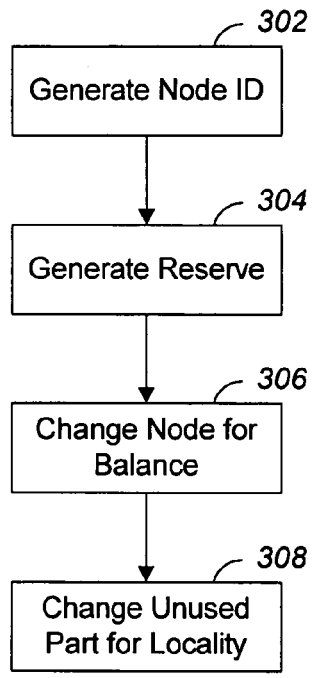
FIG. 3 illustrates a method for generating a universal identifier for a data object.

As shown in FIG. 3, in one implementation, a preliminary node ID for a new object is generated (step 302) using a hash or pseudo-random generator algorithm that assigns 0 or 1 to each of the bits in the server ID with equal probability. This also generates (step 304) a value for the unused part of the server ID, which will be referred to as the "reserved bits". The algorithm can generate the server ID as a function of object data, as one in a sequence of pseudo-random numbers, or otherwise. Because the generated addresses are uniformly distributed, on average, the nodes will be approximately equally loaded. However, if the nodes become unbalanced, the generated address may optionally be changed as a result of traversing the node tree to find appropriate node (step 306).

In one alternative, a process for balancing the load on the nodes is based on data size. The process traverses the tree from its root. For each level in the tree, the process determines whether to use the "0" or the "1" path based on free capacity in both paths. Let c0 be the free capacity (in percent) of the "0" path and c1, the free capacity of the "1" path. Then, the "0" path is selected with probability (in percent) of $c0/(c0+c1)$. When a node (leaf in the tree) is reached, that node has been selected, and the generated node address for the new object is modified accordingly. Optionally, a minimum and maximum probability limit is established to prevent imbalance in an almost empty system and overflow of a node in an almost full system.

In another alternative, a process for balancing the load on the nodes is based on server process ("CPU") load and operates along the lines just described, using CPU capacity rather than data capacity. In a further alternative, a metric based on both CPU and data size is used.

The selected node or a server in the selected node may optionally also change the reserved bits of the server ID to achieve good data locality (step 308). If the selected node is split one or more times, one or more of the reserved bits will be used to identify the node on which the object is stored, as will be described below. For consistency with the description above, this bit or these bits will be referred to as the leading reserve bit or bits. To provide data locality for a set of objects, the server can give one or more of the leading reserve bits of the universal IDs of the set of objects the same value, so that they will stay together across one or more splittings of the node.

In an alternative implementation, no preliminary node server ID is generated; rather, the node for the new object is selected directly. This can be done using a load balancing algorithm, e.g. one of the ones described above. The reserve bits of the server ID can be generated as a pseudo-random number at the same time. Alternatively, the reserve bits can be generated by a back-end server in the first instance. In any event, a back-end server will generate the object ID part of the universal ID.

When a node (i.e., each server in the node) has insufficient data storage space, the node may be split. Because the universal identifier and, more particularly, the server ID, has a fixed length, the server ID uniquely identifies one node among all nodes that could be created in the cluster, and also uniquely identifies one node among all nodes that might exist at any time in the cluster.

Figure 4:
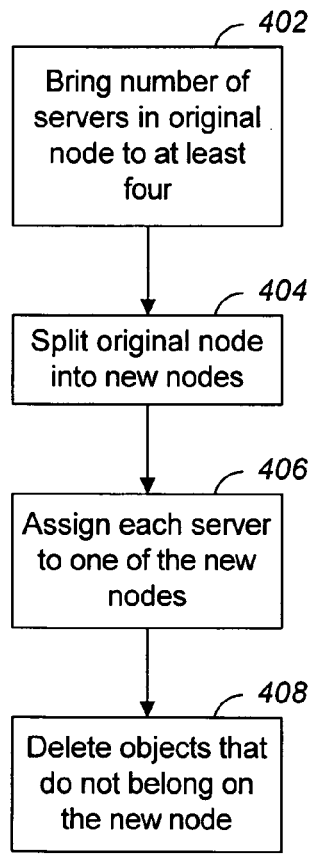
FIG. 4 illustrates a method for splitting a node into two subnodes.

FIG. 4 illustrates one method of splitting a node. As mentioned earlier, every node in a cluster should have at least two servers to guarantee continued operation in case one server fails. Thus, before a node is split, it should have at least four servers. If the node does not, servers are optionally added and mirrored so that the node—which will be referred to as the original node—has at least four servers before the split occurs (step 402).

Splitting an original node will create from one leaf in the node tree (illustrated in FIG. 2) an interior tree node with two leaves. The data is thus split into two parts according to the leading reserve bit in the server ID of each object stored in the original node.

To the extent data had been distributed uniformly, each new node will be the correct storage place of about half of the original data. This causes a maximum unbalance of about 1:2 in the use of data capacity between different nodes. However, a load-balancing process for adding new objects to the system will tend to equalize this imbalance. Splitting a node that was split a short time before would create an imbalance bigger than 1:2. However, it is unlikely that a newly created split node will be selected to be split in a short time and before it is fully loaded. For this reason, the backend tree will stay more or less balanced as new nodes are added.

As shown in FIG. 4, the original node is split (step 404). Although more than two new nodes can, in principle, be created in this step, the actions for a normal, two-way split will be described. One of the new nodes will have a node ID that is the node ID of the original node with a "0" added; the other new node will have a node ID that is the node ID of the original node with a "1" added. Thus, to take the example of the node tree illustrated in FIG. 2, when the node that originally was at position 209, which had had a node ID of "011", was split, new nodes 208 and 210 were created, which have node IDs of "0110" and "0111", respectively.

Returning to FIG. 4, each of the servers of the original node is placed in exactly one of the new nodes (step 406) and, as explained above, each new node should get at least two servers from the original node.

Immediately after the new nodes are created, each new node will have all the objects that were stored on the original node, some of which will belong on one new node and others of which will belong on the other new node. Although the universal ID, including the server ID, of an object does not change, the used part, which is recognized as the node ID, will increase as a bit is, in effect, taken from the reserved bits and added to the node ID. At this point, a background process can be started to clean up each new node and delete objects that do not belong on the new node (step 408) according to the server IDs of the objects. The end result is that each of the objects from the original node remains stored on exactly one of the new nodes. While this is being done, the cluster can be used normally, and new objects can be added even to the new nodes as they are being cleaned up.

When the properties of a cluster are established, a set of what will be referred to as ultimate identifiers is defined. These are referred to as ultimate identifiers because they are the node identifiers for the nodes that will exist when all possible node splitting has been done; in the implementation described above, this corresponds to the ultimate state of the node tree. In every earlier state of the node tree and the cluster, some or all of the node IDs will represent or correspond to a subset of multiple ultimate identifiers, and in the ultimate state, each node ID represents or corresponds to a subset of one ultimate identifier.

Figure 5:
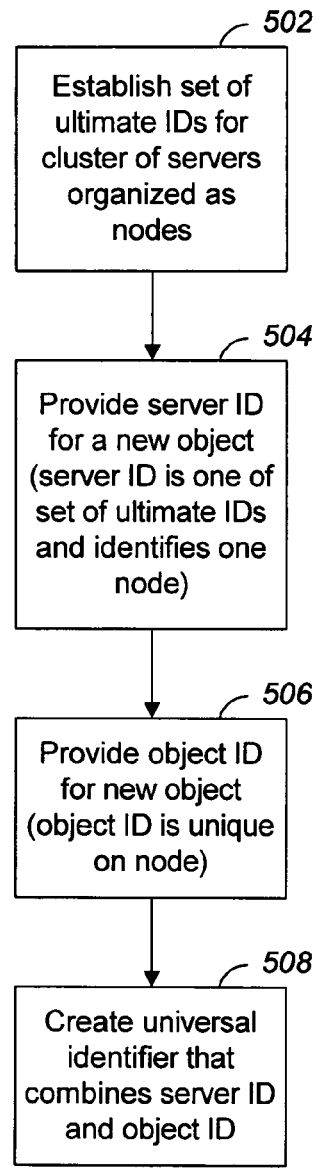
FIG. 5 illustrates a method for managing a cluster.

In these terms, as shown in FIG. 5, one implementation of a system in accordance with the invention can be described as follows. Preliminarily, a set of ultimate identifiers is established for a cluster of servers organized as nodes (step 502). This can be done explicitly, but in general it is done implicitly when the structure of a node ID is determined. When a new object is to be stored, the system provides a server ID for the new object; where the server ID is one of the ultimate identifiers and identifies exactly one particular node in the cluster where the new object will be stored (step 504). The system also provides an object ID for the new object (step 506). The object ID is unique within the node where the object will be stored. The system then creates a universal identifier that combines the server ID and the object ID (step 508).

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, steps of the described methods can be performed in different orders and still achieve useful results. Accordingly, other embodiments are within the scope of the following claims.

What is claimed is:

1. A computer-implemented method for managing data storage servers, the method steps performed by one or more processors and comprising:
   establishing, by the one or more processors, a cluster of back-end servers organized into at least one leaf node, every back-end server in any leaf node mirroring every other back-end server in the same leaf-node;
   establishing, by the one or more processors, a predefined set of ultimate identifiers for nodes that could be created in the cluster, each leaf node in the cluster having a node identifier that is unique in the cluster and one of the predefined set of ultimate identifiers;
   storing every new data object on the cluster on particular back-end servers assigned to a particular leaf node of the at least one leaf node, the particular leaf node having a particular node identifier that identifies a subset of the set of ultimate identifiers, and providing for each new data object a universal identifier that combines
      (i) an object identifier that is unique on the particular leaf node; and
      (ii) a server identifier, where the server identifier includes
         (a) a leaf node ID part having a value corresponding to the particular identifier of the particular leaf node to which the particular back-end server is assigned, and
         (b) an unused part having an at least partially arbitrary value, and
      Where the node identifiers for nodes existing in the cluster at any one time identify non-overlapping subsets of the set of ultimate identifiers;
   splitting, by the one or more processors, a first leaf node of the at least one leaf node into at least two new leaf nodes that replace the first leaf node; and
   assigning, by the one or more processors, to each new leaf node, at least one of the back-end servers of the first leaf node such that replacing the first leaf node reassigns the back-end servers, originally organized in the first leaf node, to the new leaf nodes, where assigning back-end servers to one of the new leaf nodes includes:
      appending a portion of the unused part of the server identifier, of each of the back-end servers of the first leaf node, to the leaf node ID part of the server identifier to create an updated leaf node ID part, wherein each updated leaf node ID part corresponds to a node identifier of one of the new leaf nodes; and
      assigning each back-end server of the first leaf node to the new leaf node having a node identifier corresponding to the updated leaf node ID part of the back-end server.

2. The method of claim 1, wherein:
the set of ultimate identifiers is a set of binary numbers of a fixed length; and
each leaf node in the cluster has a node identifier that is a binary number of the fixed length or of a length less than the fixed length.

3. The method of claim 1, wherein:
each node identifier identifies a subset of the set of ultimate identifiers by being a beginning part or an ending part of each identifier in the subset or by being the only identifier in the subset.

4. The method of claim 1, wherein:
the unused part of the server identifier comprises a part generated as a pseudo random value.

5. The method of claim 4, wherein:
the pseudo random value is generated by a back-end server.

6. The method of claim 4, wherein:
the pseudo random value is generated by a front-end server.

7. The method of claim 1, where
the first leaf node had a first node identifier that identified a first subset of the set of ultimate identifiers,
the new leaf nodes each have a distinct node identifier that identifies a new distinct subset of the first subset, and
the union of the new distinct subsets is the first subset; and
the method further comprising removing from each back-end server of each new leaf node any data objects that have a server identifier that does not correspond to the node identifier for the new leaf node to which the back-end server is assigned.

8. The method of claim 7, wherein:
the set of ultimate identifiers is a set of binary numbers of a fixed length;
the first leaf node has a first node identifier that is a binary number of a length less than the fixed length; and
the node identifier of each new leaf node includes within it the binary number of the first node identifier.

9. The method of claim 7, further comprising:
using a load measured for each leaf node in the cluster in selecting the first leaf node as a leaf node to be split.

10. The method of claim 9, wherein the measured load comprises aggregate data capacity of servers organized in each leaf node in the cluster.

11. The method of claim 7, further comprising:
determining whether the first leaf node has fewer than four back-end servers and, if it does, adding back-end servers to the first leaf node so that the first leaf node has at least four back-end servers, and populating the added back-end servers with all of the data objects stored on the first leaf node, before splitting the first leaf node.

12. The method of claim 1, wherein each server identifier has a fixed value.

13. The method of claim 12, wherein the server identifier has a value comprising a concatenation of the leaf node ID part and unused part.

14. A computer program product, tangibly embodied on a non-transitory computer storage device, for managing data storage servers, the product being operable to cause data processing apparatus to perform operations comprising:
  establishing a cluster of back-end servers organized into at least one leaf node, every back-end server in any leaf node mirroring every other back-end server in the same leaf node;
  establishing a predefined set of ultimate identifiers for nodes that could be created in the cluster, each leaf node in the cluster having a node identifier that is unique in the cluster and one of the predefined set of ultimate identifiers;
  storing every new data object on the cluster on particular back-end servers assigned to a particular leaf node of the at least one leaf node, the particular leaf node having a particular node identifier, and providing for each new data object a universal identifier that combines
    (i) an object identifier that is unique on the particular node; and
    (ii) a server identifier, where the server identifier includes:
      a) a leaf node ID part having a value corresponding to the particular leaf node identifier of the particular leaf node to which the particular back-end server is assigned, and
      b) an unused part having at least partially arbitrary value, and
  where the node identifiers for nodes existing in the cluster at any one time identify non-overlapping subsets of the set of ultimate identifiers;
  splitting a first leaf node of the at least one leaf node into at least two new leaf nodes that replace first leaf node;
  assigning to each new leaf node at least one of the back-end servers of the first leaf node such that replacing the first leaf node reassigns the back-end servers, originally organized in the first leaf node, to the new leaf nodes, where assigning back-end servers to one of the new leaf nodes includes appending a portion of the unused part of the server identifier, of each of the back-end servers of the first leaf node, to the leaf node ID part of the server identifier to create and updated leaf node ID part, wherein each updated leaf node ID part corresponds to a node identifier of one of the new leaf nodes; and
  removing from each back-end server of each new leaf node any data objects that have a server identifier with an updated leaf node ID part that does not correspond to the node identifier for the new leaf node to which the back-end server is assigned.

15. The product of claim 14, wherein:
  the set of ultimate identifiers is a set of binary numbers of a fixed length; and
  each leaf node in the cluster has a node identifier that is a binary number of the fixed length or of a length less than the fixed length.

16. The product of claim 15, wherein:
  the set of ultimate identifiers is the set of 32 bit binary numbers; and
  the object identifier is a 32 bit binary number.

17. The product of claim 14, wherein:
  each node identifier identifies a subset of the set of ultimate identifiers by being a beginning part or an ending part of each identifier in the subset or by being the only identifier in the subset.

18. The product of claim 14, wherein:
  the unused part of the server identifier comprises a part generated as a pseudo random value.

19. The product of claim 18, wherein:
  the pseudo random value is generated by a back-end server.

20. The product of claim 18, wherein:
  the pseudo random value is generated by a front-end server.

21. The product of claim 14, where
  the first leaf node had a first node identifier that identified a first subset of the set of ultimate identifiers,
  the new leaf nodes each have a distinct node identifier that identifies a new distinct subset of the first subset, and
  the union of the new distinct subsets is the first subset.

22. The product of claim 21, wherein:
  the set of ultimate identifiers is a set of binary numbers of a fixed length;
  the first leaf node has a first node identifier that is a binary number of a length less than the fixed length; and
  the node identifier of each new leaf node includes within it the binary number of the first node identifier.

23. The product of claim 21, further operable to cause data processing apparatus to perform operations comprising:
  using a load measured for each leaf node in the cluster in selecting the first leaf node as a leaf node to be split.

24. The product of claim 21, further operable to cause data processing apparatus to perform operations comprising:
  determining whether the first leaf node has fewer than four back-end servers and, if it does, adding back-end servers to the first leaf node so that the first leaf node has at least four back-end servers, and populating the added back-end servers with all of the data objects stored on the first leaf node, before splitting the first leaf node.

25. A system for managing data storage, comprising:
  a memory storing a cluster of back-end servers organized into at least one leaf node, every back-end server in any leaf node mirroring every other back-end server in the same leaf node; and
  at least one processor that, when executed:
  establish a predefined set of ultimate identifiers for nodes that could be created in the cluster, each leaf node in the cluster having a node identifier that is unique in the cluster and one of the predefined set of ultimate identifiers; where the set of ultimate identifiers is a set of binary numbers of a fixed length;
  cause every new data object on the cluster to be stored on a particular leaf node of the at least one leaf node, the particular leaf node having a particular node identifier that identifies a subset of the set of ultimate identifiers, and providing for the object a universal identifier that combines (i) an object identifier that is unique on the particular leaf node; and (ii) a server identifier, where the server identifier has a fixed value, is one of the ultimate identifiers in the subset, and includes an identification of the particular node identifier of the particular leaf node to which the particular back-end server is assigned, and where the node identifiers for nodes existing in the cluster at any one time identify non-overlapping subsets of the set of ultimate identifiers;
  split a first leaf node of the at least one leaf node into at least two new leaf nodes that replace the first leaf node; and
  assign to each new leaf node, at least one of the back-end servers of the first leaf node such that replacing the first leaf node reassigns the back-end servers, originally organized in the first leaf node, to the new leaf nodes, where the server identifiers of the reassigned back-end servers each include an identification of the node identifier of the new leaf node to which the reassigned back-end server has been reassigned.

26. The system of claim 25, wherein:
the set of ultimate identifiers is a set of binary numbers of a fixed length; and
each leaf node in the cluster has a node identifier that is a binary number of the fixed length or of a length less than the fixed length.

27. The system of claim 26, wherein:
the set of ultimate identifiers is the set of 32 bit binary numbers; and
the object identifier is a 32 bit binary number.

28. The system of claim 25, wherein:
the unused part of the server identifier comprises a part generated as a pseudo random value.

29. The system of claim 28, wherein:
the pseudo random value is generated by a back-end server.

30. The system of claim 28, wherein:
the pseudo random value is generated by a front-end server.

31. The system of claim 25, where
the first leaf node had a first node identifier that identified a first subset of the set of ultimate identifiers,
the new leaf nodes each have a distinct node identifier that identifies a new distinct subset of the first subset, and
the union of the new distinct subsets is the first subset; and
the at least one processor, when executed, removes from each back-end server of each new leaf node any data objects that have a server identifier that does not correspond to the node identifier for the new leaf node to which the back-end server is assigned.

32. The system of claim 31, wherein the at least one processor uses a load measured for each leaf node in the cluster in selecting the first leaf node as a leaf node to be split.

33. The system of claim 25, wherein:
the node identifier of each new leaf node includes within it the binary number of the first node identifier.

34. The system of claim 31,
wherein the at least one processor, when executed, determines whether the first leaf node has fewer than four back-end servers and, if it does, adds back-end servers to the first leaf node so that the first leaf node has at least four back-end servers, and populates the added back-end servers with all of the data objects stored on the first leaf node, before splitting the first leaf node.

35. A computer-implemented method for managing data storage servers, the method steps performed by one or more processors and comprising:
establishing, by the one or more processors, a cluster of back-end servers organized into at least one leaf node, every leaf node in the cluster having a node identifier that is unique in the cluster, every back-end server in any leaf node mirroring every other back-end server in the same leaf-node;
establishing, by the one or more processors, a predefined set of ultimate identifiers for nodes that could be created in the cluster,
storing every new data object on the cluster on a particular leaf node of the at least one leaf node, the particular leaf node having a particular node identifier that identifies a subset of the set of ultimate identifiers, and providing for the object an universal identifier that combines
(i) an object identifier that is unique on the particular leaf node; and
(ii) a server identifier, where the server identifier is one of the ultimate identifiers in the subset, and where the node identifiers for nodes existing in the cluster at any one time identify non-overlapping subsets of the set of ultimate identifiers;
determining, by the one or more processors, whether the first leaf node has fewer than four back-end server and, if it does, adding back-end servers to the first leaf node so that the first leaf node has at least four back-end servers, and populating the added back-end servers with all of the data objects stored on the first leaf node, before splitting the first leaf node;
splitting, by the one or more processors, a first leaf node of the at least one leaf node into at least two new leaf nodes that replace the first leaf node, wherein:
the first leaf node had a first node identifier that identified a first subset of the set of ultimate identifiers,
the new leaf nodes each have distinct node identifier that identifies a new distinct subset of the first subset, and
the union of the new distinct subsets in the first subset; and
splitting, by the one or more processors, the first leaf node comprising assigning back-end servers, originally organized in the first leaf node, to the new leaf nodes by replacing the first leaf node such that each new leaf node is assigned at least two of the back-end server originally organized in the first leaf node, wherein a first of the back-end servers assigned to each new leaf node mirrors other back-end servers assigned to the particular new leaf node but does not mirror the back-end servers in the other new leaf nodes replacing the first leaf node; and
removing, by the one or more processors, from each back-end server of each new leaf node any data objects that have a server identifier that does not correspond to the node identifier for the new leaf node to which the back-end server is assigned, node ID part of the back-end server.

* * * * *